Patented Apr. 7, 1936

2,036,410

UNITED STATES PATENT OFFICE 2,036,410

PROCESS OF MAKING STYRENE

George D. Graves, Wilmington, Del., assignor to E. I. du Pont de Nemours & Company, Wilmington, Del., a corporation of Delaware No Drawing. Application August 20, 1929, Serial No. 387,269

8 Claims. (Cl. 260—168)

This invention relates to the preparation of coating materials; more specifically it relates to the production of styrene, otherwise known as vinyl benzene, a chemical whose polymer product is most valuable as a lacquer base, by the dehydrogenation of ethyl benzene; and still more specifically it relates to the use of a catalyst for increasing the efficiency of this process.

Non-catalytic means of producing styrene by the dehydrogenation of ethyl benzene are known, but tests show that these methods are most inefficient and result in the loss of a considerable proportion of ethyl benzene, and also result in a low yield of styrene. The best results obtainable with old methods show less than 40% of the ethyl benzene consumed converted to styrene.

This invention has as an object the manufacture of styrene from ethyl benzene by a method which prevents the loss of ethyl benzene. A further object is, by the use of a catalyst, to increase the efficiency of the reaction by which ethyl benzene is manufactured. A still further object is the production of an apparatus capable of withstanding the reaction. Other objects will appear as the description proceeds.

The above objects are accomplished by the following invention, which consists broadly in passing ethyl benzene over a catalyst held in a container of suitable material, in condensing the product, and in separating out the styrene.

I find that the catalytic dehydrogenation of ethyl benzene is best carried on at temperatures ranging between 450° C. and 700° C., with the most efficient temperatures above 600° C.

The most satisfactory catalysts which I have invented are cerium oxide and/or zinc oxide promoted with such metallic oxides as those of tungsten, uranium and molybdenum. It is to be noted that the oxides of the metals last named are also efficient alone. Silica gel also acts as a catalyst for this reaction, but is not as efficient as those above named. The cerium oxide catalyst appears to be the best at present because of its cheapness and ease of preparation. It is best made by igniting commercial cerium oxalate to the oxide and forming the resulting powder into pellets in the usual way.

In the process a tube of glass, or iron, or other suitable material is filled with the catalyst and supported in a furnace capable of maintaining it at the desired temperature (say 650° C.). Ethyl benzene is fed as a liquid into a suitable vaporizer and the vapors are conducted over the catalyst. The vapors after passing over the catalyst are condensed and the condensate is subsequently distilled, the distillate containing essentially nothing but ethyl benzene and styrene. The styrene can then be polymerized and the ethyl benzene recovered by distillation from the non-volatile meta styrene polymer.

The following are examples of experiments conducted using this method:—

Example 1

Using 15 cc. of the catalyst and passing the ethyl benzene over it at the rate of 1 cc. of ethyl benzene per minute, the condensed liquid contained 15 to 20% of styrene; the loss as gas amounted to only about 2%. The distillation of the condensate left a residue amounting to about 2% of material boiling above styrene.

Example 2

Using 250 cc. of catalyst in a glass lined reaction tube and passing 2000 cc. of ethyl benzene per hour at 670° C., the catalyst used being cerium oxide, conversions of about 15% were obtained with a loss of from 2 to 3% of the ethyl benzene.

It is explained that by the term "yield" is meant the percentage of ethyl benzene not recovered as such which was converted into styrene. Yields above 90% are usual with this process where prior processes yielded less than 40%.

It is further explained that the term "conversion" as here used refers to the percent of ethyl benzene converted to styrene based on the total amount fed to the catalyst. Conversions of 20% are usual with this process where prior processes gave conversions of 8 to 12%.

It will be seen that this process has a great advantage over prior processes in that a much smaller percentage of ethyl benzene is lost; that a doubled yield and a far larger conversion take place; and that the method uses materials which are inexpensive and therefore suited to commercial production.

In the experiments various reaction tubes were used but metallic tubes such as iron and copper were found to decompose a certain amount of the reacting materials, which resulted in the formation of gas. It was, therefore, apparent that some material must be found capable of withstanding the reaction without decomposing the materials. By inserting a glass lining within the iron tube, the high decomposition was stopped and the excellent results described above obtained.

Although specific examples of the process have been given, they are not to be construed as limitative of the invention, which is clearly capable of wide and varied modifications within the limits set by the appended claims.

The process of making vinyl benzene from ethyl benzene is not limited to ethyl benzene per se but is equally applicable to the substitution products of ethyl benzene such as diethyl benzene, ethyl diphenyl, chloroethyl benzene, isopropyl benzene, cymene, unsymmetrical ditolyl ethane, naphthalene, etc. from which are obtained substituted vinyl benzene and naphthalene derivatives.

I claim:

1. In the production of styrenes from vapors of aromatic hydrocarbons, having an aliphatic side chain with at least two carbon atoms and up to two aromatic nuclei, at a temperature between about 500° and about 700° C., the step which comprises contacting said vapors with a dehydrogenation catalyst difficulty reducible under the conditions of working.

2. In the production of styrenes from vapors of aromatic hydrocarbons, having an aliphatic side chain with at least two carbon atoms and up to two aromatic nuclei, at a temperature between about 500° and about 700° C., the step which comprises contacting said vapors, with a dehydrogenation catalyst comprising essentially a metal compound difficultly reducible under the conditions of working.

3. The process for producing vinyl-aryl hydrocarbons by contacting aromatic hydrocarbons containing an aliphatic side chain of at least two carbon atoms at temperatures between 450° and 700° C. with a catalyst selected from the group consisting of zinc oxide, silica gel, tungsten oxide, uranium oxide and molybdenum oxide.

4. The process for producing vinyl-aryl hydrocarbons by contacting aromatic hydrocarbons containing an aliphatic side chain of at least two carbon atoms with cerium oxide at temperatures between 450° and 700° C.

5. The method of making styrene which comprises heating ethyl benzene vapors in the presence of one of a class of compounds consisting of cerium oxide, zinc oxide, tungsten oxide, uranium oxide, molybdenum oxide, and silica gel at a temperature between about 450° C. and about 700° C.

6. The method of making styrene which comprises passing ethyl benzene vapors through a reaction tube containing one of a class of compounds consisting of cerium oxide, zinc oxide, tungsten oxide, uranium oxide, molybdenum oxide, and silica gel at a temperature between about 450° C. and about 700° C.

7. The method of making styrene which comprises passing ethyl benzene vapors through a ceramic reaction tube containing one of a class of compounds consisting of cerium oxide, zinc oxide, tungsten oxide, uranium oxide, molybdenum oxide, and silica gel at a temperature between 600° C. and 700° C.

8. The method of making styrene which comprises, passing ethyl benzene vapors through a glass reaction tube containing one of a class of compounds consisting of cerium oxide and zinc oxide promoted with at least one of a class of compounds consisting of tungsten oxide, uranium oxide, and molybdenum oxide at a temperature of about 650° C.

GEORGE D. GRAVES.